(12) United States Patent
Laborda Rubio

(10) Patent No.: US 11,421,657 B2
(45) Date of Patent: Aug. 23, 2022

(54) BLADE ASSEMBLY METHOD ON A ROTOR HUB OF A WIND TURBINE

(71) Applicant: Nordex Energy Spain, S.A.U., Barasoain (ES)

(72) Inventor: Jose Luis Laborda Rubio, Barasoain (ES)

(73) Assignee: NORDEX ENERGY SPAIN, S.A.U., Barasoain (ES)

( * ) Notice: Subject to any disclaimer, the term of this patent is extended or adjusted under 35 U.S.C. 154(b) by 0 days.

(21) Appl. No.: 17/137,642

(22) Filed: Dec. 30, 2020

(65) Prior Publication Data
US 2021/0199092 A1 Jul. 1, 2021

(30) Foreign Application Priority Data
Dec. 31, 2019 (EP) .................................. 19383217

(51) Int. Cl.
*F03D 13/10* (2016.01)
*F03D 1/06* (2006.01)
*B66C 23/18* (2006.01)

(52) U.S. Cl.
CPC .......... *F03D 13/10* (2016.05); *F03D 1/0658* (2013.01); *B66C 23/185* (2013.01); *F05B 2230/61* (2013.01); *F05B 2240/221* (2013.01)

(58) Field of Classification Search
CPC ..... F03D 13/10; F03D 1/0658; B66C 23/185; F05B 2230/60; F05B 2230/61; F05B 2240/221
See application file for complete search history.

(56) References Cited

U.S. PATENT DOCUMENTS

| 2006/0147308 A1* | 7/2006 | Wobben ................ F03D 1/0658 416/132 B |
| 2017/0233228 A1* | 8/2017 | Coners .................. B66C 23/185 29/889.21 |
| 2019/0085818 A1* | 3/2019 | Neumann ............. F03D 1/0658 |
| 2021/0231101 A1* | 7/2021 | Messing ............... F03D 7/0224 |

FOREIGN PATENT DOCUMENTS

| WO | 2004070203 A2 | 8/2004 |
| WO | 2018149372 A1 | 8/2018 |

* cited by examiner

*Primary Examiner* — Moshe Wilensky
(74) *Attorney, Agent, or Firm* — Hayes Soloway P.C.

(57) ABSTRACT

The present invention relates to a blade assembly method on a rotor hub of a wind turbine wherein the maximum torque supported by the gearbox is greater in one direction than in other (positive in the invention instead of negative) selecting an appropriate direction for rotating the hub and an appropriate side for connecting each blade.

21 Claims, 3 Drawing Sheets

BLADE ASSEMBLY METHOD ON A ROTOR HUB OF A WIND TURBINE

CROSS-REFERENCE TO RELATED APPLICATIONS AND PRIORITY

This patent application claims priority from EP Patent Application No. 19383217.7 filed Dec. 31, 2019. The patent application is herein incorporated by reference in its entirety.

OBJECT OF THE INVENTION

The present invention relates to a blade assembly method on a rotor hub of a wind turbine that enables increasing the wind conditions in which the assembly of wind turbines can be done by selecting an appropriate direction for rotating the hub and an appropriate side for connecting each blade and/or appropriately selecting and applying different wind speed limits to each of the method steps.

BACKGROUND OF THE INVENTION

A wind turbine generally comprises a tower and a nacelle positioned on top of the tower. A wind turbine rotor with three wind turbine blades is connected to the nacelle through a low speed shaft.

The rotor assembly can be performed either through a single hoisting operation of the set hub-blades (which has been previously preassembled on the ground) or hoisting and assembling each blade one by one (blade by blade assembly method).

According to the last method, each blade is hoisted and attached to the hub individually. Prior to the connection of the blades to the hub, the hub is rotated such that the connection flange between the hub and the blade reaches an adequate position (preferably three or nine o'clock rotor position for a horizontal assembly or six o'clock rotor position for a vertical assembly).

Once the first blade is attached to the hub, the hub is rotated again until another blade connection flange reaches the adequate position that allows the connection of a second blade. This operation is repeated for assembling the third blade after attaching the second blade.

The blade-by-blade assembly method is quite critical in terms of loads since, at some stages and until the three blades are assembled, the wind turbine is subject to significant load imbalances due to the displacement of the centre of gravity from the rotor axis. This can be more or less critical depending on the azimuthal position of the rotor and on the number of blades already assembled.

Such an imbalance causes a torque that needs to be bore by some mechanical components of the drive train. It even may happen that the maximum torque induced by this situation is greater than the maximum torque during operation of the wind turbine and therefore, it will determine the design of several mechanical components such as the hub, the low-speed shaft (LSS), the gearbox or even the main frame of the wind turbine and the connections between themselves.

The known horizontal blade-by-blade assembly method is performed from one of the sides of the wind turbine in such a way that the position of the crane used to hoist the blades to the hub does not need to be changed during the assembly. Hereunder, the sides of the wind turbine must be understood as those defined by lateral sides of the nacelle. As a consequence, the hub having one or two blades previously assembled must be rotated to a position forming 120 degrees or 240 degrees with regard to the initial position of the hub in which the first blade has been attached. This horizontal blade-by-blade assembly method comprises the following steps (azimuthal positions identified looking at the wind turbine from an upwind position):

a first step wherein a first blade connection flange of the hub is located in an azimuthal position (generally 3 o'clock position) and a first blade is attached in a substantial horizontal position to the first blade connection flange of the hub. Once this first step has been carried out the drive train is subjected to the maximum negative torque;

a second step wherein the first blade connection flange of the hub having the first blade attached is rotated in a first direction until a second blade connection flange of the hub is located in the azimuthal position. Once this second step has been carried out, the drive train is brought under a positive torque. The absolute value of this torque is lower than the torque in the first position;

a third step wherein a second blade is attached in a substantial horizontal position to the second blade connection flange of the hub located in the azimuthal position. Once this third step has been carried out, the drive train is subjected to a resulting negative torque position.

a fourth step wherein the hub having the first blade and the second blade respectively attached to the first connection flange and the second connection flange is rotated in the first direction until a third blade connection flange of the hub is located in the 3 o'clock position. Once this fourth step has been carried out, the gearbox is brought under the maximum torque, in this case being a maximum positive torque; and a fifth step wherein a third blade is attached in a substantial horizontal position to the third blade connection flange of the hub located in the 3 o'clock position. Once this fifth step has been carried out, the drive train is subjected to a torque having a null value since the rotor is finally balanced.

Gearboxes' shafts can rotate both in clockwise and anti-clockwise direction and in general terms, gearboxes are able to support the same torque level in both directions of rotation. However new optimized designs of gearboxes are sized to support a torque level that is higher in a specific direction (direction of rotation of the wind turbine under normal operation of rotation), conventionally called positive torque, than in the opposite one.

When this design of gearboxes is the one selected, there are steps in conventional blade-by-blade assembly methods in which the negative torque generated by the rotor imbalance exceeds the maximum negative torque that the gearbox can stand according to its optimized design. In those cases, a structural failure of the gearbox could occur during the rotor assembly stage.

In order to avoid these drawbacks, solutions like redesigning the gearbox, using blade-by-blade assembly tools that allow attaching the blade to the hub with a certain inclination with respect to the horizontal position (in order to reduce the induced torque on the gearbox) or even, attaching counterweights to the hub to compensate the imbalances have been implemented. However, all of them involve an extra cost associated to the wind turbine installation and, in some instances, the time windows in which the blade assembly is possible is greatly reduced as it is only permitted at very low wind speeds, implying big potential delays in the construction stages.

DESCRIPTION OF THE INVENTION

The present invention relates to a blade assembly method on a rotor hub of a wind turbine which solves the aforementioned drawbacks since the torque supported by the gearbox, when it is maximum, is always positive instead of negative, selecting an appropriate direction for rotating the hub and an appropriate side for connecting each blade. It has been considered that, in terms of loads, the gearbox is the weakest mechanical component of the wind turbine. However, the effects and torques supported by the gearbox are also applicable to any other mechanical component of the wind turbine of those mentioned in the background of the invention or being included in a known wind turbine.

The blade assembly method on a rotor hub of a wind turbine of the present invention,
wherein the wind turbine comprises:
a tower,
a nacelle;
a rotor comprising a hub;
wherein the nacelle and the rotor are disposed on top of the tower;
three blades intended to be attached to the hub of the rotor disposed on top of the tower;
comprises the following steps:
a first step wherein a first blade connection flange of the hub is located in a first azimuthal position and a first blade is attached in a substantial horizontal position to the first blade connection flange of the hub. Once this first step has been carried out, the gearbox, that is the weakest mechanical component, is brought under the maximum positive torque;
a second step wherein the first blade connection flange of the hub having the first blade attached is rotated in a first direction until a second blade connection flange of the hub is located in the first azimuthal position. Once this second step has been carried out, the gearbox is brought under a negative torque. The absolute value of this torque is lower than the torque after the first step because the first blade is not horizontally disposed;
a third step wherein a second blade is attached in a substantial horizontal position to the second blade connection flange of the hub located in the first azimuthal position. Once this third step has been carried out, the gearbox is again brought under a resulting positive torque position. The second blade which has just been attached to the hub compensates the negative torque induced by the first blade;
a fourth step wherein the hub having the first blade and the second blade respectively attached to the first connection flange and the second connection flange is rotated in a second direction opposite to the first direction until a third blade connection flange of the hub is located in a second azimuthal position. Once this fourth step has been carried out, the gearbox is again brought under the maximum positive torque as that defined after the first step; and
a fifth step wherein a third blade is attached in a substantial horizontal position to the third blade connection flange of the hub located in the second azimuthal position. Once this fifth step has been carried out, the gearbox is again brought under a resulting zero torque position since the rotor is balanced.

Optionally, in the second stage, the first blade connection flange of the hub having the first blade attached is rotated, preferably 120 degrees, in the first direction until the second blade connection flange of the hub is located in the first azimuthal position.

Optionally, in the fourth step, the hub having the first blade and the second blade respectively attached to the first connection flange and the second connection flange is rotated, preferably 60 degrees, in the second direction opposite to the first direction until the third blade connection flange of the hub is located in the second azimuthal position.

Preferably, the first direction is a clockwise direction looking at the wind turbine from an upwind position. In this way, the maximum torque experienced by the wind turbine is positive (+) instead of negative (−) as it can happen in the known horizontal blade-by-blade assembly method described above.

In this way, and preferably, the attaching of the first blade and the attaching of the second blade respectively in the first and the third steps are carried out from a right side of the wind turbine looking at the wind turbine from an upwind position and the fifth step is carried out from a left side of the wind turbine looking at the wind turbine from an upwind position. Hereunder, the sides of the wind turbine must be understood as those defined by the lateral sides of the nacelle.

Therefore, over the course of the method of the present invention, the gearbox is brought to the same maximum torque value in two specific moments of the assembly method (at the end of the first step and at the end of the fourth step) but said torque value is always positive, i.e. in the direction of maximum strength of the gearbox (or the mechanical component that limits the mounting procedure), thus resulting in a more capacity of the drive train of the wind turbine to support his maximum torque.

Although the wind turbine wherein the method of the present invention is carried out is subject to significant load imbalances due to the displacement of the centre of gravity from the rotor axis, at some stages and until the three blades are assembled, with the assembly method of the present invention it is avoided: i) a non-optimized design of the mechanical components, ii) the use of auxiliary retaining cranes or counterweights and iii) the use of expensive non-horizontal blade attaching tools.

Moreover, the rotation of the hub following the method of the present invention is reduced from 120 degrees to 60 degrees in the fourth step, with regard to the corresponding step of the state of the art method.

Optionally, the method further comprises a sixth, seventh and eighth steps wherein the first, the second and the third blades are hoisted to the hub respectively, preferably by means of a crane.

Optionally, the blade assembly method of the present invention further comprises measuring or estimating a wind speed value and establishing at least two different wind speed limits, a first upper wind speed limit applicable to at least one step of the assembly method and a second upper wind speed limit applicable to at least another step of the assembly method wherein each step of the assembly method is carried out only when the wind speed value is below at least its respective applicable wind speed limit.

Optionally, at each stage of the assembly method, the wind speed value is estimated or measured at least once in order to determine if the estimated or measured value is below its respective applicable limit.

Therefore, there is at least one wind speed limit for each step of the method of the present invention, wherein the at least one wind speed limit is checked to determine whether or not it is exceeded by the wind speed value in each step. On the other hand, state of the art methods either i. provide that the most restrictive value of all wind speeds limits is applied to all assembly steps (which reduces the temporary windows for wind turbine rotor assembly operations) or ii. alternatively provide the use of torque compensation elements (such as additional masses connected to the rotor bearings where there is not yet a blade connected).

Besides, in the state of the art, the wind speed limits are imposed by the cranes used to hoist the blades to the hub and their operation is restricted to wind speeds not exceeding 12 to 15 m/s.

The method of the present invention sets wind speed limits dependent both on the wind turbine configuration (more precisely the blade length and weight and on the drive train (gearbox) torque restrictions) and on the step of the assembly method.

Depending on the step of the assembly method, the measured or estimated wind speed (wind speed value) (preferably a 10-minute average) is compared with the first and/or the second wind speed limit, wherein the first and/or the second limits are the wind speed values at which the torque limit supported by the wind turbine is reached. These wind values depend on the operation of the assembly method to be carried out since there are two important variables that affect the torque:

1. The position of the rotor and the number and weight of the blades already assembled.

2. The pitch angle of the blades, because the pitch angle is modified during the assembly method (e.g.: a first pitch angle is used during the attachment of the blades to the hub and a second pitch angle is used during the rotation of the hub).

As depending on the number of blade/s already assembled, the rotor is supporting a different, the additional torque value the rotor can support with regard to the torque limit can be calculated. Therefore, the assembly method of the present invention further comprises a step of calculating a torque value of the torque that the rotor is able to support without exceeding a torque limit.

In this way, the method of the present invention allows not to oversize the gearbox (or coupling disc) only for non-operating states.

Optionally, the assembly method of the present invention comprises a step of recalculating the value of the wind speed measured or estimated (wind speed value) as a function of air density in order to calculate an effective wind speed, so that the whole possible assembly window can be used (the limits will usually be given to the standard or certification density of the turbine and the wind measurements have to be adapted to compare them with the wind speed limits (first upper limit and/or second upper limit at the same density).

The step of measuring or estimating the wind speed can also be carried out with the known horizontal blade-by-blade assembly method described above in the background of the invention section, not being linked this step to a specific blade assembly method.

Moreover, a blade assembly method comprising:
at least one step of attaching at least a first blade to a first blade connection flange of a hub and/or at least one step of rotating a first blade connection flange of the hub in a first direction; and
the step of measuring the wind speed, wherein the at least one step of attaching the at least a first blade to a first blade connection flange of a hub and/or at least one step of rotating a first blade connection flange of the hub in a first direction is carried out only when a wind speed measured in the step of measuring the wind speed is below at least a first upper wind speed limit;
is here included in this description. This method limits the torque that the gearbox has to support.

PREFERRED EMBODIMENT OF THE INVENTION

Figure 1:
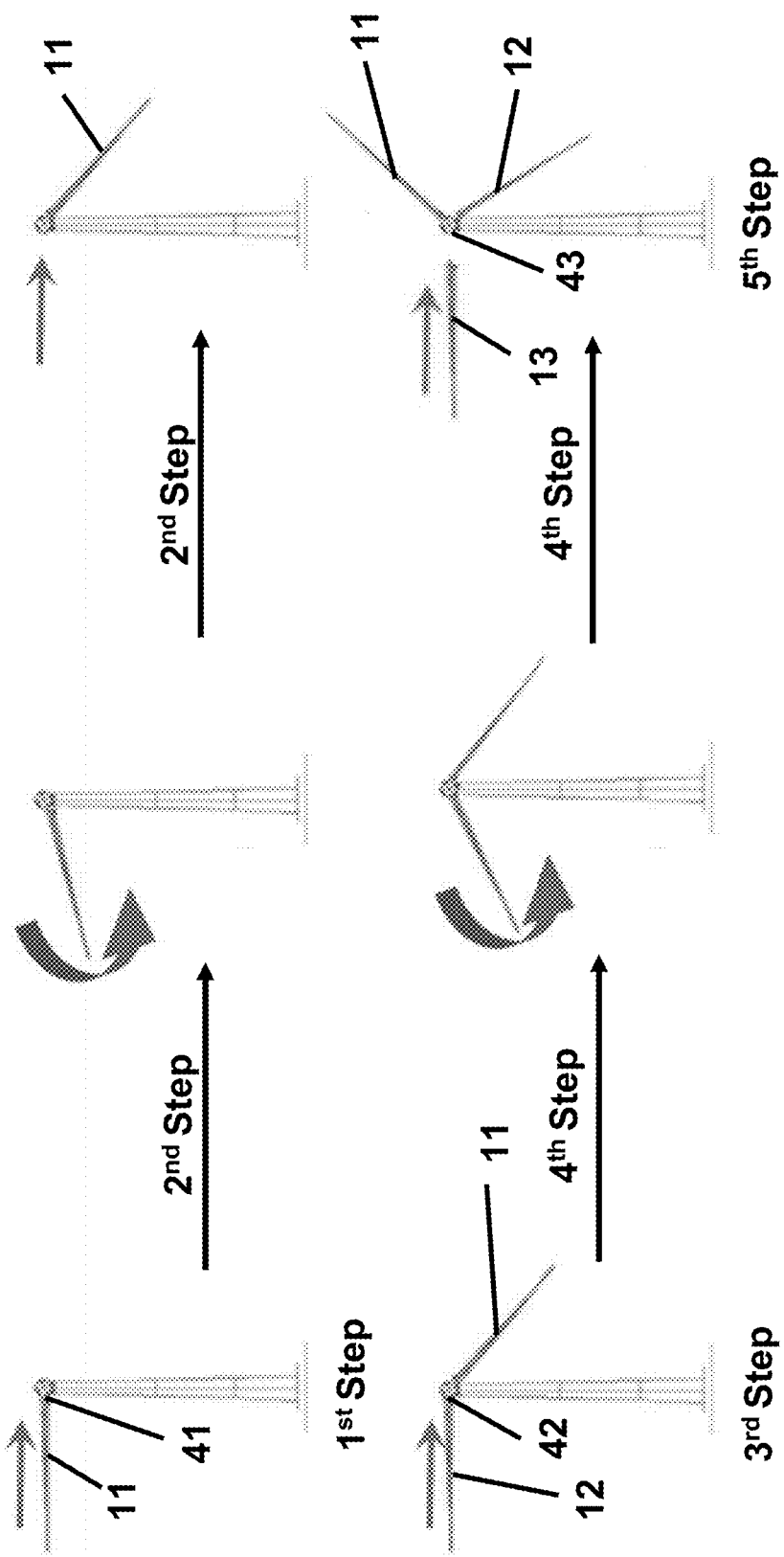
FIG. 1 shows the steps of a horizontal blade-by-blade assembly method according to the state of the art looking at the wind turbine from an upwind position.
Figure 2:
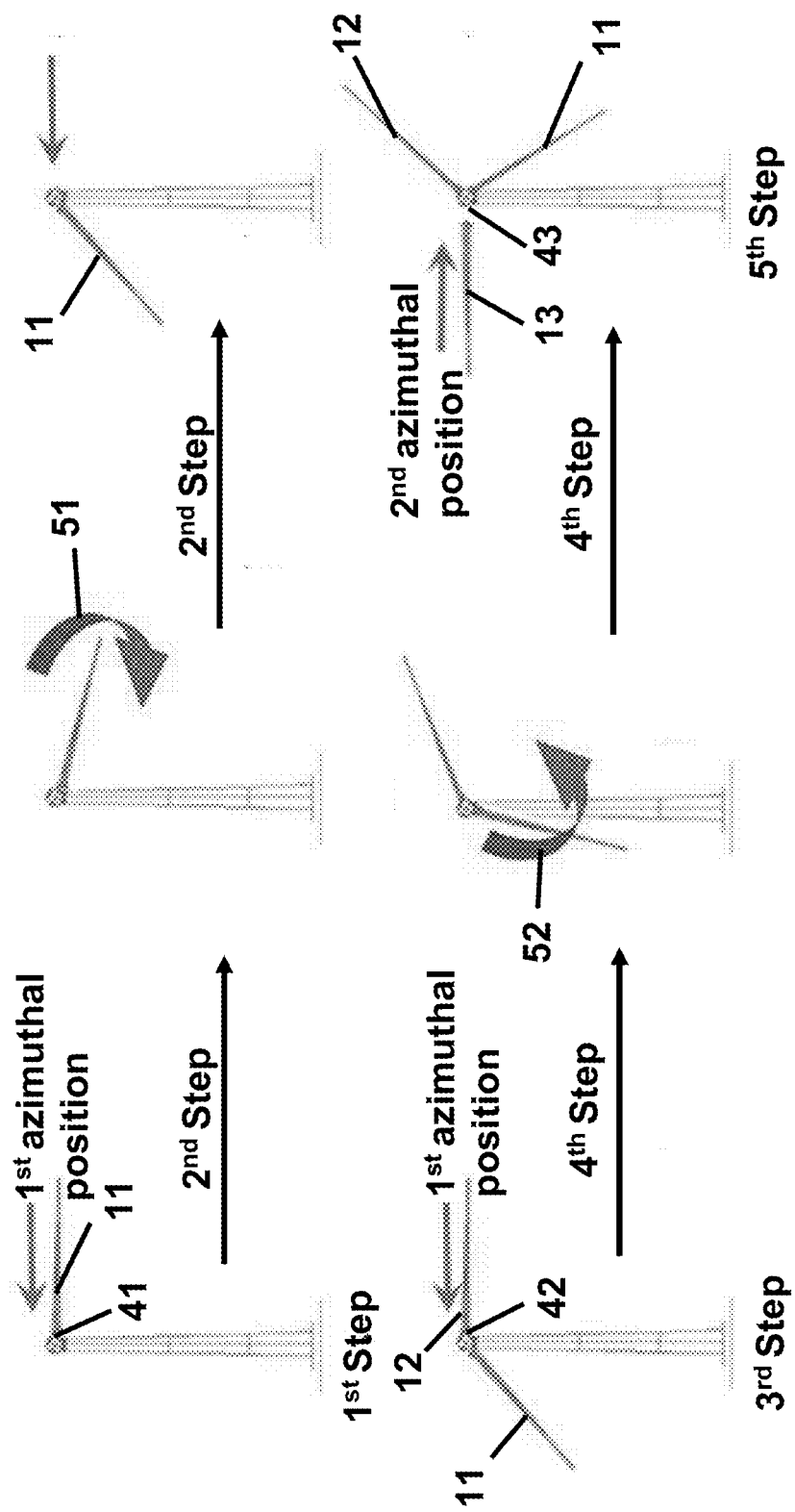
FIG. 2 shows the steps of the assembly method of the present invention looking at the wind turbine from an upwind position.
Figure 3:
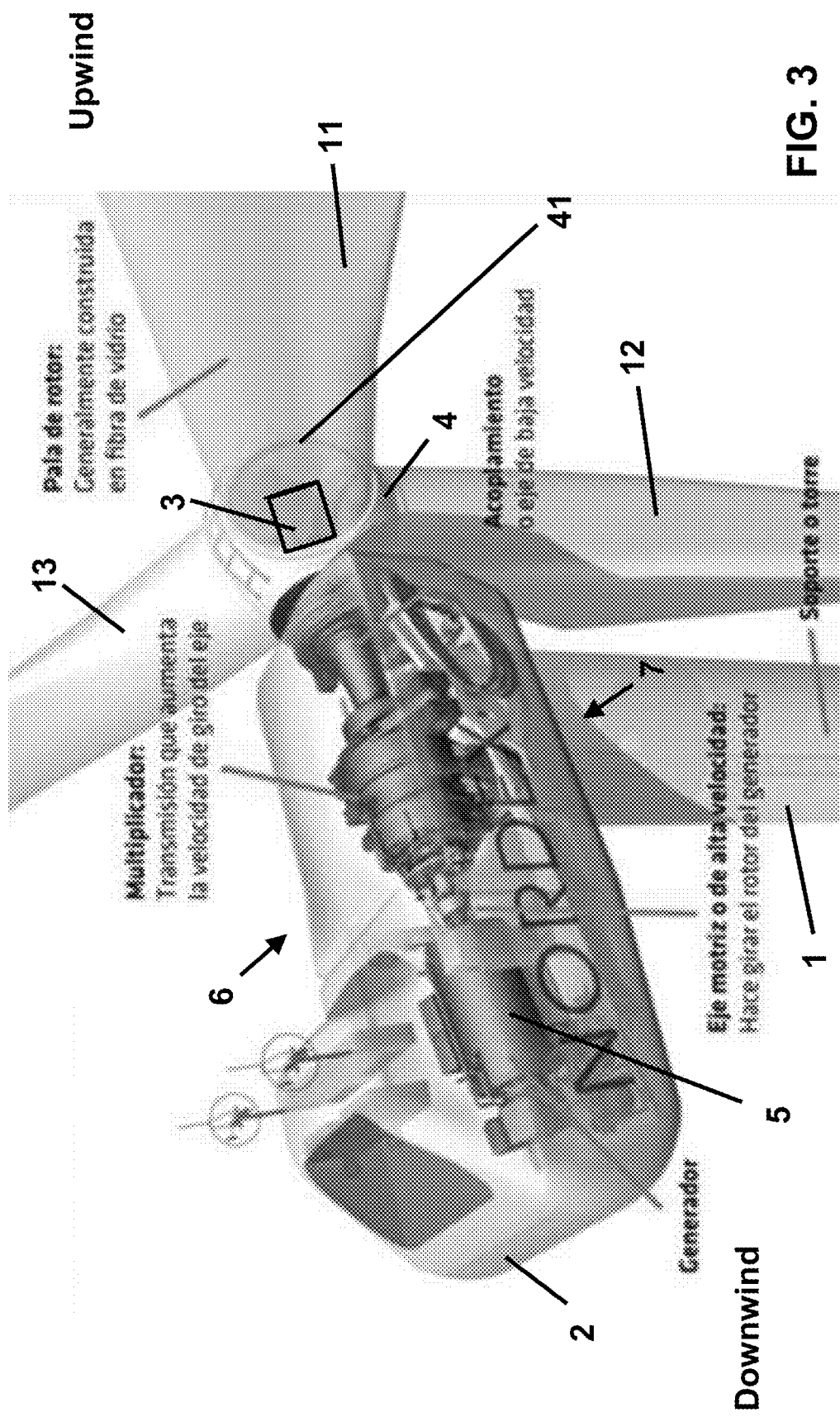
FIG. 3 show a scheme of the components of the wind turbine.

In a first preferred embodiment of the invention, the blade assembly method on a rotor hub of a wind turbine of the present invention,
wherein the wind turbine comprises:
a tower (1),
a nacelle (2) comprising a generator (5)
a rotor (3) comprising a hub (4);
wherein the nacelle (2) and the rotor (3) are disposed on top of the tower (1);
three blades (11, 12, 13) intended to be attached to the hub (4) of the rotor (3) disposed on top of the tower (1);
comprises the following steps:
a first step wherein a first blade connection flange (41) of the hub (4) is located in a first azimuthal position and a first blade (11) is attached in a substantial horizontal position to the first blade connection flange (41) of the hub (4);
a second step wherein the first blade connection flange (41) of the hub (4) having the first blade (11) attached is rotated 120 degrees in a first direction (51) until a second blade connection flange (42) of the hub (4) is located in the first azimuthal position;
a third step wherein a second blade (12) is attached in a substantial horizontal position to the second blade connection flange (42) of the hub (4) located in the first azimuthal position;
a fourth step wherein the hub (4) having the first blade (11) and the second blade (12) respectively attached to the first connection flange (41) and the second connection flange (42) is rotated 60 degrees in a second direction (52) opposite to the first direction (51) until a third blade connection flange (43) of the hub (4) is located in a second azimuthal position; and
a fifth step wherein a third blade (13) is attached in a substantial horizontal position to the third blade connection flange (43) of the hub (4) located in the second azimuthal position.

Preferably, the first direction (51) is a clockwise direction looking at the wind turbine from an upwind position.

The method further comprises a sixth, seventh and eighth steps wherein the first (11), the second (12) and the third blades (13) are hoisted to the hub (4) respectively, preferably by means of a crane (not shown in the Figures).

Preferably, the sixth and seventh steps wherein the first (11) and the second blades (12) are hoisted to the hub (4) respectively, preferably by means of the crane, are carried out adjacent to a right side (6) of the wind turbine, looking at the wind turbine from an upwind position, and the eight step wherein the third blade (13) is hoisted to the hub (4), preferably by means of a crane, is carried out adjacent to a left side (7) of the wind turbine, looking at the wind turbine from an upwind position.

Preferably, the sixth step is carried out before the first step, the seventh step is carried out before the third step and the eighth step is carried out before the fifth step. More preferably, the seventh step is carried out before the second step, after the second step, or simultaneously to the second step, and the eighth step is carried out before the fourth step, after the fourth step, or simultaneously to the fourth step.

The method further comprises measuring or estimating a wind speed value and establishing at least two different wind speed limits, a first upper wind speed limit applicable to at least one step of the assembly method and a second upper wind speed limit applicable to another step of the assembly method wherein each step of the assembly method is carried out only when the wind speed value is below its respective applicable wind speed limit.

In this case, different 10-min averaged wind speed limits for each machinery combination such as including rotor diameter, gearbox model and shrink disc model can be measured. However, it can be defined also specific 10-min averaged wind speed limits for each step to obtain a more detailed definition wherein different torque values will be shown on each step of the method.

Additionally, if the torque in no wind conditions can be supported by the drive train components, yaw error can be taken into account in order to increase the wind speed limits because in some conditions it helps minimizing the torque. So if a wind vane is available during the blade assembly, it can be used to increase wind speed limits improving the available interval to perform the assembly.

Since the wind speed limits are based on some air density, if a temperature and pressure sensors are available on the wind turbine (that can be more accurate adding a humidity sensor also), the air density can be used to update the wind speed limit to the corresponding site specific air density at the moment of the blade assembly using the following equation:

$$V_{hub@\rho} = V_{hub@\rho_{calc}} \cdot \left(\frac{\rho_{calc}}{\rho}\right)^{\frac{1}{3}}$$

wherein $V_{hub@\rho}$ is the wind speed limit corresponding to the site specific air density at hub height;

$V_{hub@\rho_{calc}}$ is the wind speed limit calculated to a density value $\rho_{calc}$ at hub height at the moment of the blade assembly;

$\rho_{calc}$ is the calculated density from the temperature, pressure and relative humidity at the moment of the blade assembly;

and $\rho$ is the site specific air density.

The assembly method of the present invention allows an onsite assembly process to reduce the impact of blade assembly procedure so that implies cost reduction on that part of the balance of a wind turbine plant avoiding delays that would have big impact on the final cost. The method reduces the delays by allowing other options with small impact on the process, such us preparing the blades on the ground previously to their hoisting.

The invention claimed is:

1. A blade assembly method on a hub of a wind turbine, wherein the wind turbine comprises:
   a tower,
   a nacelle comprising a generator,
   a rotor comprising the hub;
wherein the nacelle and the rotor are disposed on top of the tower; and
   three blades intended to be attached to the hub of the rotor disposed on top of the tower; and
wherein the method comprises the following steps:
   a first step wherein a first blade connection flange of the hub is located in a first azimuthal position and a first blade is attached in a substantial horizontal position to the first blade connection flange of the hub;
   a second step wherein the first blade connection flange of the hub having the first blade attached is rotated 120 degrees in a first direction wherein a second blade connection flange of the hub is located in the first azimuthal position;
   a third step wherein a second blade is attached in a substantial horizontal position to the second blade connection flange of the hub located in the first azimuthal position;
   a fourth step wherein the hub having the first blade and the second blade respectively attached to the first connection flange and the second connection flange is rotated in a second direction opposite to the first direction until a third blade connection flange of the hub is located in a second azimuthal position; and
   a fifth step wherein a third blade is attached in a substantial horizontal position to the third blade connection flange of the hub located in the second azimuthal position.

2. The method of claim 1 wherein in the fourth step, the hub having the first blade and the second blade respectively attached to the first connection flange and the second connection flange is rotated 60 degrees in the second direction opposite to the first direction wherein the third blade connection flange of the hub is located in the second azimuthal position.

3. The method of claim 1 wherein the first direction is a clockwise direction looking at the wind turbine from an upwind position.

4. The method of claim 3 wherein the attaching of the first blade and the attaching of the second blade respectively in the first and the third steps are carried out from a right side of the wind turbine looking at the wind turbine from the upwind position and the attaching of the third blade in the fifth step is carried out from a left side of the wind turbine looking at the wind turbine from the upwind position, the sides of the wind turbine understood as those defined by lateral sides of the nacelle.

5. The method of claim 1 further comprising a sixth, seventh and eighth steps wherein the first, the second and the third blades are hoisted to the hub respectively.

6. The method of claim 5 further comprising measuring or estimating a wind speed value and establishing at least two different wind speed limits, a first upper wind speed limit applicable to at least one step of the method and a second upper wind speed limit applicable to at least another step of the method wherein each step of the method is carried out only when the wind speed value is below at least its respective applicable wind speed limit.

7. The method of claim 6 wherein at each step of the method, the wind speed value is estimated or measured at least once in order to determine if the estimated or measured value is below its respective applicable limit.

8. The method of claim 6 wherein the wind speed value is a 10-minute averaged speed.

9. The method of claim 6 further comprising a step of recalculating a value of the wind speed value as a function of the air density in order to calculate an effective wind speed.

10. The method of claim 9 wherein the recalculated value of the wind speed measured as a function of the air density is carried out using the following equation:

$$V_{hub@\rho} = V_{hub@\rho_{calc}} \cdot \left(\frac{\rho_{calc}}{\rho}\right)^{\frac{1}{3}}$$

wherein $$V_{hub@\rho}$$

is the wind speed limit corresponding to the site specific air density at hub height;

$$V_{hub@\rho_{calc}}$$

is the wind speed limit calculated to a density value $\rho_{calc}$ at hub height at the moment of the blade assembly;

$\rho_{calc}$ is the calculated density from the temperature, pressure and relative humidity at the moment of the blade assembly;
and
$\rho$ is the site specific air density.

11. The method of claim 1 further comprising a step of calculating a torque value of the torque that the rotor is able to support without exceeding a torque limit.

12. The method of claim 1 wherein in the fourth step, the hub having the first blade and the second blade respectively attached to the first connection flange and the second connection flange is rotated 60 degrees in the second direction opposite to the first direction wherein the third blade connection flange of the hub is located in the second azimuthal position.

13. The method of claim 1 wherein the first direction is a clockwise direction looking at the wind turbine from an upwind position.

14. The method of claim 2 wherein the first direction is a clockwise direction looking at the wind turbine from an upwind position.

15. The method of claim 13 wherein the attaching of the first blade and the attaching of the second blade respectively in the first and the third steps are carried out from a right side of the wind turbine looking at the wind turbine from an upwind position and the attaching of the third blade in the fifth step is carried out from a left side of the wind turbine looking at the wind turbine from an upwind position, the sides of the wind turbine understood as those defined by lateral sides of the nacelle.

16. The method of claim 14 wherein the attaching of the first blade and the attaching of the second blade respectively in the first and the third steps are carried out from a right side of the wind turbine looking at the wind turbine from an upwind position and the attaching of the third blade in the fifth step is carried out from a left side of the wind turbine looking at the wind turbine from an upwind position, the sides of the wind turbine understood as those defined by lateral sides of the nacelle.

17. The method of claim 1 further comprising a sixth, seventh and eighth steps wherein the first, the second and the third blades are hoisted to the hub respectively.

18. The method of claim 2 further comprising a sixth, seventh and eighth steps wherein the first, the second and the third blades are hoisted to the hub respectively.

19. The method of claim 4 further comprising a sixth, seventh and eighth steps wherein the first, the second and the third blades are hoisted to the hub respectively.

20. A blade assembly method on a hub of a wind turbine, wherein the wind turbine comprises:
    a tower,
    a nacelle comprising a generator,
    a rotor comprising the hub;
wherein the nacelle and the rotor are disposed on top of the tower; and
    three blades intended to be attached to the hub of the rotor disposed on top of the tower; and
wherein the method comprises the following steps:
    a first step wherein a first blade connection flange of the hub is located in a first azimuthal position and a first blade is attached in a substantial horizontal position to the first blade connection flange of the hub;
    a second step wherein the first blade connection flange of the hub having the first blade attached is rotated in a first direction until a second blade connection flange of the hub is located in the first azimuthal position;
    a third step wherein a second blade is attached in a substantial horizontal position to the second blade connection flange of the hub located in the first azimuthal position;
    a fourth step wherein the hub having the first blade and the second blade respectively attached to the first connection flange and the second connection flange is rotated in a second direction opposite to the first direction until a third blade connection flange of the hub is located in a second azimuthal position different from the first azimuthal position; and
    a fifth step wherein a third blade is attached in a substantial horizontal position to the third blade connection flange of the hub located in the second azimuthal position.

21. A blade assembly method on a hub of a wind turbine, wherein the wind turbine comprises:
    a tower,
    a nacelle comprising a generator,
    a rotor comprising the hub;
wherein the nacelle and the rotor are disposed on top of the tower; and
    three blades intended to be attached to the hub of the rotor disposed on top of the tower; and
wherein the method comprises the following steps:
    a first step wherein a first blade connection flange of the hub is located in a first azimuthal position and a first blade is attached in a substantial horizontal position to the first blade connection flange of the hub;

a second step wherein the first blade connection flange of the hub having the first blade attached is rotated in a first direction, wherein a second blade connection flange of the hub is located in the first azimuthal position and wherein the first direction is a clockwise direction looking at the wind turbine from an upwind position;

a third step wherein a second blade is attached in a substantial horizontal position to the second blade connection flange of the hub located in the first azimuthal position;

a fourth step wherein the hub having the first blade and the second blade respectively attached to the first connection flange and the second connection flange is rotated in a second direction opposite to the first direction until a third blade connection flange of the hub is located in a second azimuthal position; and a fifth step wherein a third blade is attached in a substantial horizontal position to the third blade connection flange of the hub located in the second azimuthal position, and wherein the attaching of the first blade and the attaching of the second blade respectively in the first and the third steps are carried out from a right side of the wind turbine looking at the wind turbine from the upwind position and the attaching of the third blade in the fifth step is carried out from a left side of the wind turbine looking at the wind turbine from the upwind position, the sides of the wind turbine understood as those defined by lateral sides of the nacelle.

* * * * *